United States Patent [19]

Yoshifusa et al.

[11] Patent Number: 5,049,733
[45] Date of Patent: Sep. 17, 1991

[54] SEMICONDUCTOR CHIP DETECTING DEVICE FOR PROVIDING FOCUSING AND REPRODUCTION SIGNALS

[75] Inventors: Koji Yoshifusa; Hikaru Nishihara; Taizo Yokota, all of Hiroshima, Japan

[73] Assignee: Sharp Kabushiki Kaisha, Osaka, Japan

[21] Appl. No.: 504,672

[22] Filed: Apr. 4, 1990

[30] Foreign Application Priority Data

Apr. 7, 1989 [JP] Japan .................................. 1-89315

[51] Int. Cl.$^5$ ............................ G01J 1/20; G11B 7/00
[52] U.S. Cl. .................................. 250/201.5; 369/44.41
[58] Field of Search ........................ 250/201.5, 208.2; 369/44.12, 44.41, 44.42, 44.25, 44.37, 44.27, 44.29, 44.11; 350/3.7, 3.72, 3.73

[56] References Cited

U.S. PATENT DOCUMENTS

| 4,736,354 | 4/1988 | Yoshio | 369/44.41 |
| 4,737,946 | 4/1988 | Yamashita et al. | 250/201.5 |
| 4,773,053 | 9/1988 | Gottfried | 250/201.5 |
| 4,835,378 | 5/1989 | Coops | 250/201 |
| 4,888,754 | 12/1989 | Gleim | 369/44.11 |
| 4,904,856 | 2/1990 | Nagahama et al. | 250/201.5 |

Primary Examiner—David C. Nelms
Assistant Examiner—Michael Messinger

[57] ABSTRACT

A photo detecting device has a photoelectric converting element formed on a semiconductor chip with the photoelectric converting element being divided into first and second light receiving regions. The photo detecting device further has a signal processing circuit formed on the same semiconductor chip. The signal processing circuit includes a subtracting element for subtracting an output signal from the second light receiving region from an output signal from the first light receiving region.

7 Claims, 4 Drawing Sheets

SEMICONDUCTOR CHIP DETECTING DEVICE FOR PROVIDING FOCUSING AND REPRODUCTION SIGNALS

BACKGROUND OF THE INVENTION

1. Field of the Invention

The present invention relates to a photo detecting device used in an optical pickup for an optical disk apparatus and the like and, more specifically, to an improvement of a photo detecting device including a photoelectric conversion device and the signal processing circuit formed on the same semiconductor chip.

2. Description of the Background Art

An optical pickup used in a conventional optical disk apparatus comprises a photoelectric conversion device formed on a semiconductor chip for receiving light reflected from a recording medium to convert the same into electric signals. The electric signals outputted from such a photoelectric conversion device are subjected to processes such as arithmetic amplification in a signal processing circuit, not formed as part of the semiconductor chip, to be converted into information reproducing signals, focus error signals and tracking error signals.

A recently developed integrated circuits technique involves an OPIC (Optical Integrated Circuit) photo detecting device in which the signal processing circuit as well as the photoelectric conversion device are formed on one semiconductor chip, which results in simplification of the design of the signal processing circuit.

FIG. 4 shows one example of the conventional OPIC photo detecting device. The photo detecting device comprises three photoelectric converting elements 11, 12 and 13. The central photoelectric converting element 11 has four divided light receiving regions 11a, 11b, 11c and 11d. The output signals from the light receiving regions 11a to 11b are connected to minus input terminals of differential amplifiers $A_{11}$, $A_{12}$, $A_{13}$ and $A_{14}$, respectively, and to an input terminal of an amplifier $A_{15}$ through coupling capacitors $C_{11}$, $C_{12}$, $C_{13}$ and $C_{14}$. The differential amplifiers $A_{11}$ to $A_{14}$ have their plus input terminals all grounded.

The photo electric converting elements 12 and 13 on both ends are connected to minus input terminals of the differential amplifiers $A_{16}$ and $A_{17}$, respectively. The differential amplifiers $A_{16}$ and $A_{17}$ have their plus input terminals grounded.

In the photo detecting device of FIG. 4, signals Sa, Sb, Sc and Sd outputted from the light receiving regions 11a to 11d are amplified by the differential amplifiers $A_{11}$ to $A_{14}$, respectively, to be externally outputted. In an external circuit (not shown), the following arithmetic operation is carried on the signals Sa to Sd to provide a focus error signal FES.

$$FES = (Sa + Sc) - (Sb + Sd)$$

The signals Sa to Sd outputted from the light receiving regions 11a to 11d have their fluctuation of low frequency components removed through coupling capacitors $C_{11}$ to $C_{14}$, and thereafter they are added to each other. A reproduction signal RF is provided by amplifying the summed signal $(Sa + Sb + Sc + Sd)$ by the amplifier $A_{15}$.

Further, signals Se and Sf outputted from the photoelectric converting elements 12 and 13 on both ends are amplified by the differential amplifiers $A_{16}$ and $A_{17}$, respectively, to be externally outputted, and the tracking error signal TES is provided by a subtracting operation by an external circuit.

In the photo detecting device of FIG. 4, a plurality of operational amplifiers must be provided in the external circuit for obtaining the focus error signal FES. It is difficult to provide the same characteristics to all of these plurality of operational amplifiers in the external circuit. Accordingly, when the ambient temperature changes, an offset voltage tends to be generated in the focus error signal FES obtained from the external circuit at the in-focus state. The offset voltage prevents accurate focus control.

In addition, since the photoelectric converting element 11 at the center comprises four light receiving regions 11a to 11d, four output terminals are necessary to output signals Sa to Sd to the outside from the light receiving regions. This increases the number of output terminals of the photo detecting device itself, which makes it difficult to reduce the size of the photo detecting device., In addition, when the circuit elements are to be formed on an IC chip, a capacitor requires relatively large area. Therefore, when four coupling capacitors $C_{11}$ to $C_{14}$ are provided, these capacitors occupy ⅛ to ¼ of the whole area of the IC chip, which naturally results in the IC chip being larger. This further prevents reduction in size of the photo detecting device.

SUMMARY OF THE INVENTION

In view of the foregoing, an object of the present invention is to provide a photo detecting device which is compact and in which an offset voltage in a focus error signal is hardly generated.

In accordance with one aspect of the present invention, the photo detecting device comprises a photoelectric converting element formed on a semiconductor chip, the photoelectric converting element being divided into first and second light receiving regions, and a signal processing circuit formed on the same semiconductor chip, with the signal processing circuit having subtracting means for subtracting an output signal from the second light receiving region from the output signal from the first light receiving region.

In accordance with another aspect of the present invention, the photo detecting device comprises first and second photoelectric converting elements formed on the semiconductor chip, the first photoelectric converting element being divided into first and second light receiving regions, and a signal processing circuit formed on the same semiconductor chip, the signal processing circuit having subtracting means for subtracting the output signal from the second light receiving region from the output signal of the first light receiving region, and first and second capacitor means for coupling the output from the first and second light receiving regions with the output of the second photoelectric converting element, respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings which are given by way of illustration only, and thus are not limitative of the present invention, and wherein.

DESCRIPTION OF THE PREFERRED EMBODIMENTS

Figure 1:
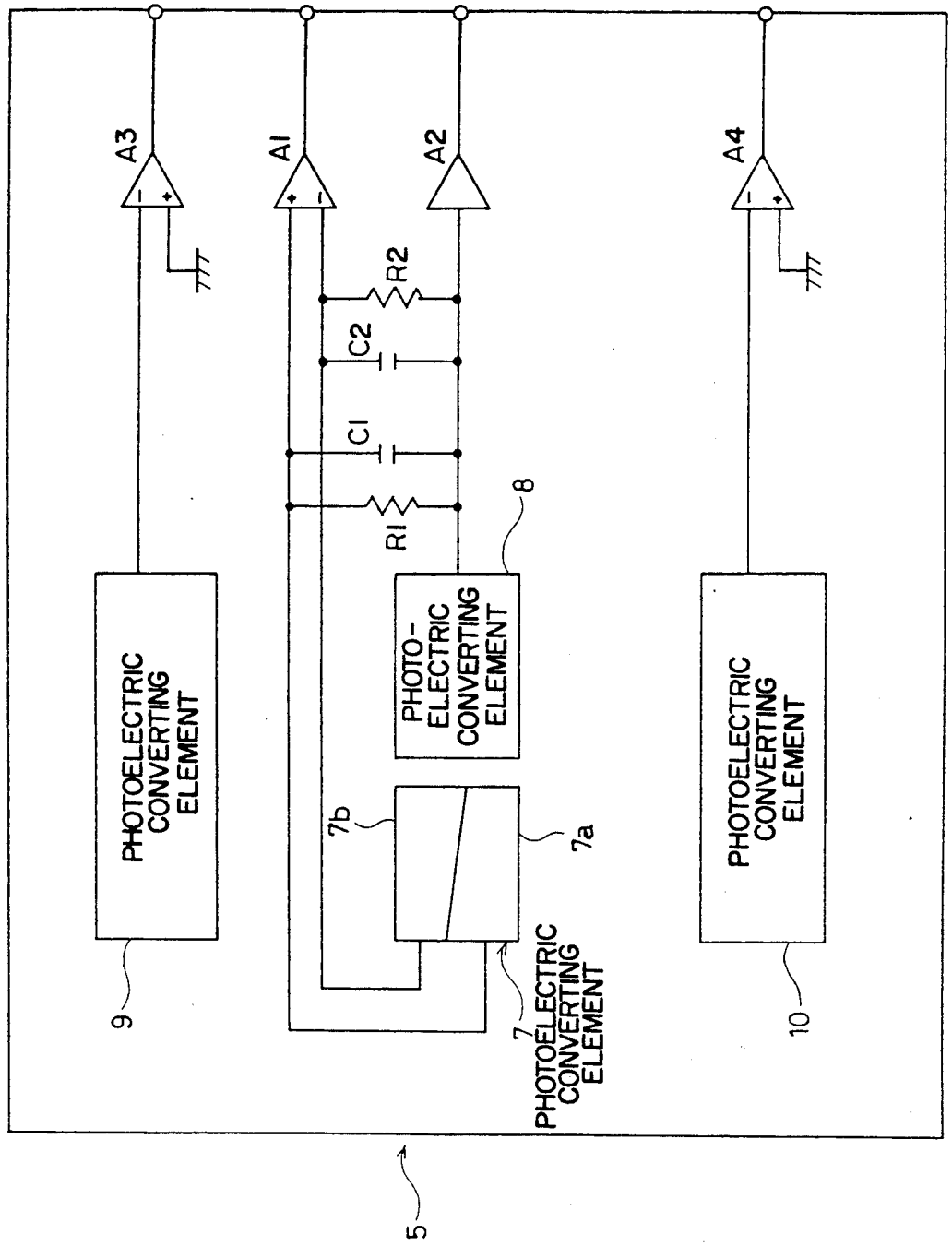
FIG. 1 is a schematic diagram illustrating an OPIC photo detecting device in accordance with one embodiment of the present invention.

Referring to FIG. 1, an OPIC photo detecting device in accordance with one embodiment of the present invention is illustrated. The photo detecting device 5 comprises four photoelectric converting elements 7, 8, 9 and 10. The photoelectric converting element 7 is divided into two light receiving regions 7a and 7b. An output signal from the light receiving region 7a is connected to a plus input terminal of a differential amplifier $A_1$ serving as a subtracting means, and an output signal of the other light receiving region 7b is connected to a minus input terminal of the same differential amplifier $A_1$. An output signal from the photoelectric converting element 8 formed of a single light receiving region is connected to an input terminal of an amplifier $A_2$. The light receiving region 7a is further connected to an input terminal of the amplifier $A_2$ through a coupling capacitor $C_1$ and a resistance $R_1$ parallel to the coupling capacitor $C_1$. The other light receiving region 7b is connected to the input terminal of the amplifier $A_2$ through a coupling capacitor $C_2$ and a resistance $R_2$ parallel to the coupling capacitor $C_2$. Output terminals of the differential amplifier $A_1$ and of the amplifier $A_2$ are provided as external outputs of the photo detecting device 5.

Output signals of the remaining photoelectric converting elements 9 and 10 are connected to minus input terminals of differential amplifiers $A_3$ and $A_4$. The differential amplifiers $A_3$ and $A_4$ have their plus input terminals grounded. The output terminals of the differential amplifiers $A_3$ and $A_4$ are provided external outputs of the photo detecting device 5.

Figure 2:
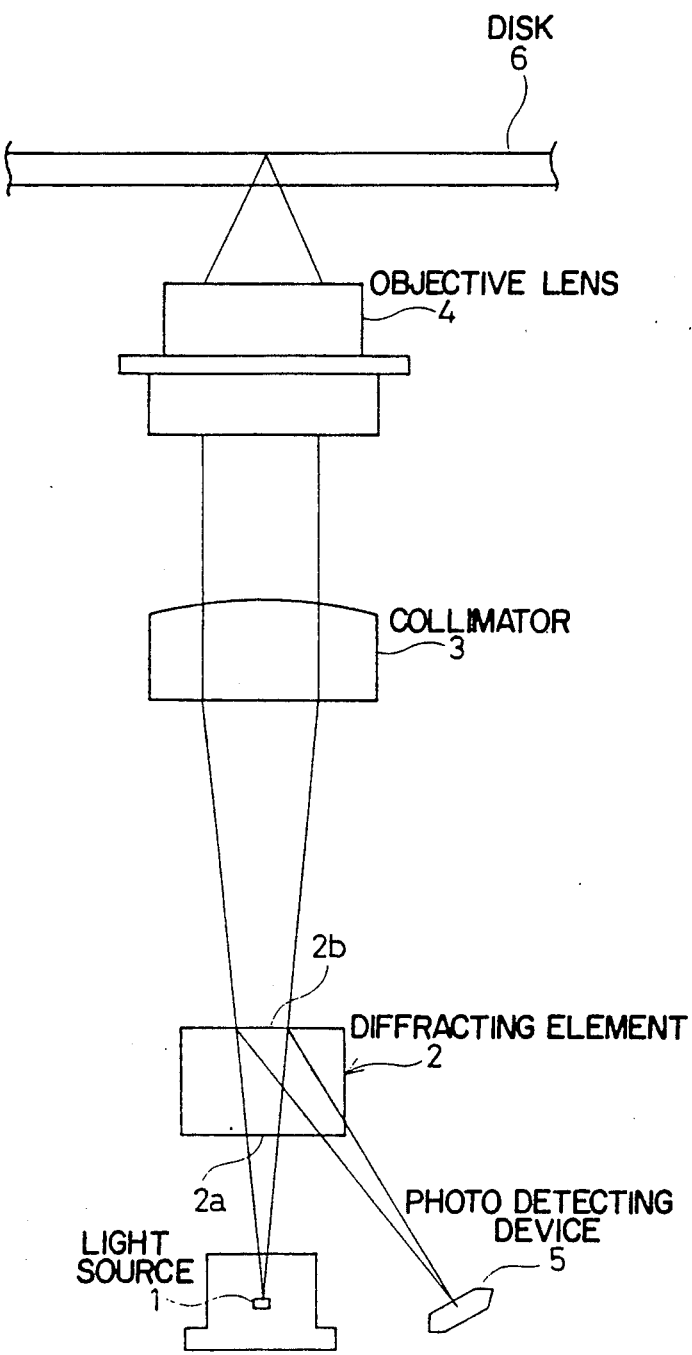
FIG. 2 illustrates main components of an optical pickup including the photo detecting device of FIG. 1.

FIG. 2 illustrates the main components of a hologram type optical pickup using the photo detecting device of FIG. 1. The principle of operation of the hologram type optical pickup is disclosed in detail in U.S. Pat. No. 4,835,378, for instance. Referring to FIG. 2, an optical beam emitted from a light source 1 is divided into three sub beams along a line by a diffraction grating 2a below a diffracting apparatus 2. The sub beams are converted into parallel sub beams by a collimator lens 3. The parallel sub beams are focused on an information surface of a disk 6 by an objective 4. The three reflected beams from the disk 6 enter the objective lens 4 and pass through the collimator lens 3. The three reflected beams passed through the collimator lens 3 are diffracted toward the photo detecting device 5 by a diffraction grating 2b above the diffracting apparatus 2. On this occasion, each of the three reflected beams along one line is divided into two sub beams. Namely, one of the sub beams divided from the central reflected beam, used for reading recorded information and for focusing, enters the photoelectric converting element 7, and the other sub beam enters the photoelectric converting element 8. Two sub beams divided from one of the reflected beams on both ends used for tracking both enter the photoelectric converting element 9. Two sub beams divided from the other one of the reflected beams on both sides both enter the photoelectric converting element 10.

Figure 3A:
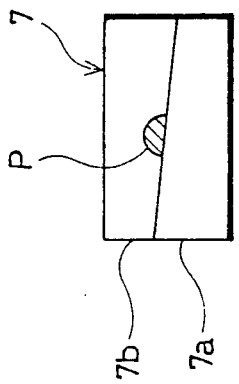
FIGS. 3A, 3B and 3C illustrate a relation between the state of an optical beam spot projected on photo detecting elements of the photo detecting device of FIG. 1 and focusing.
Figure 3B:
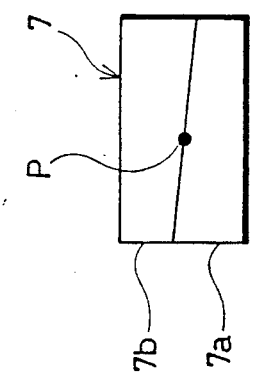
Figure 3C:
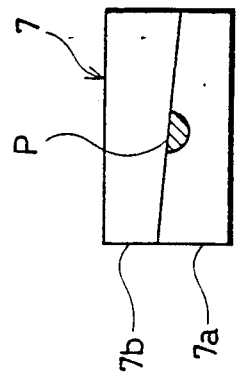
Figure 4:
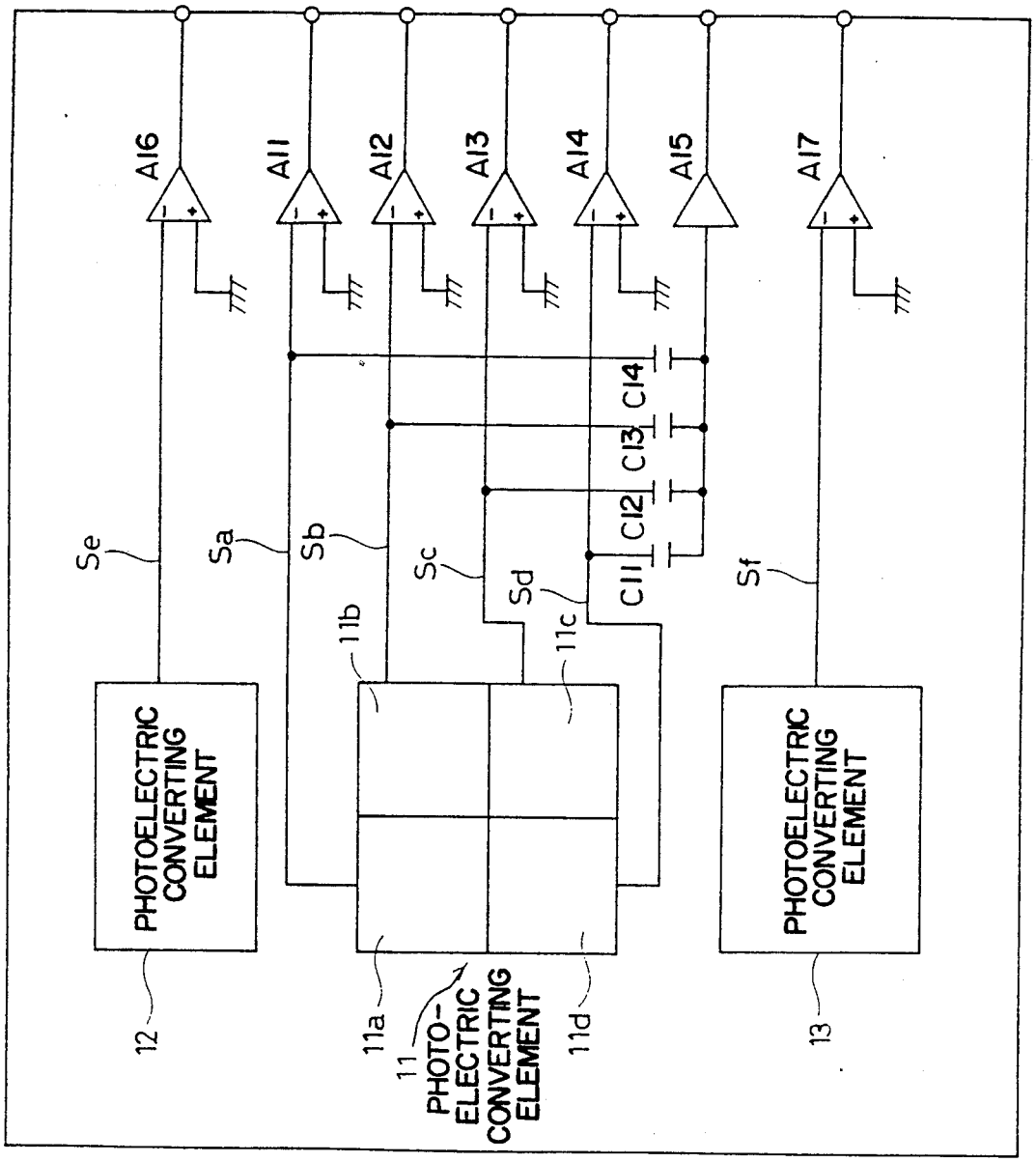
FIG. 4 schematically illustrates a conventional OPIC photo detecting device.

FIGS. 3A, 3B and 3C illustrate a relation between focusing and the state of the optical beam spot projected on the photoelectric converting element 7. When the information recording surface of the optical disk 6 is at an in-focus position, the optical spot P is a small circle crossing the boundary between two light receiving regions 7a and 7b, as shown in FIG. 3B. When the optical disk 6 moves away from the objective lens 4, the optical spot P becomes an enlarged semicircle on the light receiving region 7b, as shown in FIG. 3A. On the contrary, when the optical disk 6 moves near to the objective lens, the optical spot P become an enlarged semicircle on the light receiving region 7a, as shown in FIG. 3C. Namely, the difference between outputs from the light receiving regions 7a and 7b can be used as a focus error signal corresponding to deviation of the information recording surface of the disk 6 from the in-focus position.

The reflected sub beam projected on the light receiving regions 7a and 7b are converted into signals of the magnitudes corresponding to the intensity of light received by the light receiving regions 7a and 7b to be outputted, respectively, and thereafter the output signal from the light receiving region 7b is subtracted from the output signal from the light receiving region 7a by the differential amplifier $A_1$. The focus error signal provided by this subtraction is externally outputted.

The output signals from the light receiving regions 7a and 7b with the low frequency component thereof removed by coupling capacitors $C_1$ and $C_2$ are added to the output signal from the photoelectric converting element 8. The summed signal is amplified by the amplifier $A_2$ to be externally outputted as a reproduction signal. In addition, the DC component of the output signals from the light receiving regions 7a and 7b are added to the DC component of the output signal from the photoelectric converting element 8 through the resistances $R_1$ and $R_2$, and the added DC components are also detected. The DC components are used for distinguishing the information surface and the protection surface of the optical disk.

The output signals of the photoelectric converting elements 9 and 10 are amplified by differential amplifiers $A_3$ and $A_4$, respectively, to be outputted. The signals amplified by the differential amplifiers $A_3$ and $A_4$ are subtracted by an external circuit (not shown), to be used as the tracking error signal.

As described above, the focus error signal can be provided by arithmetic operation in the photo detecting device. Therefore, generation of an offset voltage in the focus error signal derived from the change in ambient temperature can be suppressed.

In addition, since there is only one output terminal for the focus error signal of the photo detecting device, the reduction of the number of the output terminal enables reduction of the photo detecting device in size.

In addition, since the focus error signal is calculated in the photo detecting device, a circuit for calculating the focus error signal can be removed from the external circuit. Accordingly, when the photo detecting device used is built in the optical pickup, the design of the external circuit can be simplified.

In addition, since only two coupling capacitors are provided between the two light receiving regions 7a and 7b and the single light receiving region 8, the ratio of the area occupied by the coupling capacitors to the total area of the photo detecting device becomes smaller, which further reduces the size of the photo detecting device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A photo detecting device comprising:
   a photoelectric converting element formed on a semiconductor chip, said photoelectric converting element divided into first and second light receiving regions; and
   a signal processing circuit formed on the same semiconductor chip, said signal processing circuit including
      subtracting means for subtracting an output signal from said second light receiving region from an output signal from said first light receiving region, and
      low frequency component removal means for coupling said output signals from said first and second light receiving regions and for removing low frequency components therefrom.

2. A photo detecting device comprising:
   first and second photoelectric converting elements formed on a semiconductor chip, said first photoelectric converting element being divided into first and second light receiving regions; and
   a signal processing circuit formed on the same semiconductor chip, said signal processing circuit including
      subtracting means for subtracting an output signal from said second light receiving region from an output signal from said first light receiving region, and
      first and second capacitors for coupling outputs from said first and second light receiving regions, respectively, with an output from said second photoelectric converting element.

3. The photo detecting device of claim 1, further comprising an additional photoelectric converting element, said low frequency component removal means coupling an output signal from said additional photoelectric converting element to said output signals from said first and second light receiving regions.

4. The photo detecting device of claim 3, said low frequency component removal means comprising first and second capacitors coupled between said output signals from said first and second light receiving regions, respectively, and said output signal from said additional photoelectric converting element.

5. The photo detecting device of claim 4, said low frequency component removal means further comprising first and second resistors coupled between said output signals from said first and second light receiving regions, respectively, and said output signal from said additional photoelectric converting element.

6. The photo detecting device of claim 2, said signal processing circuit further comprising first and second resistors for coupling said outputs from said first and second light receiving regions, respectively, with said output from said second photoelectric converting element.

7. The photo detecting device of claim 6, said first and second capacitors operable to remove low frequency components from said outputs of said first and second light receiving regions.

* * * * *